(12) United States Patent
Suryaputra et al.

(10) Patent No.: US 7,782,797 B2
(45) Date of Patent: Aug. 24, 2010

(54) METHODS AND APPARATUS FOR SELF PARTITIONING A DATA NETWORK TO PREVENT ADDRESS CONFLICTS

(75) Inventors: Stephen Suryaputra, Cary, NC (US); Anthony Gallo, Apex, NC (US); Matt Squire, Raleigh, NC (US)

(73) Assignee: Hatteras Networks, Durham, NC (US)

( * ) Notice: Subject to any disclaimer, the term of this patent is extended or adjusted under 35 U.S.C. 154(b) by 557 days.

(21) Appl. No.: 11/711,549

(22) Filed: Feb. 27, 2007

(65) Prior Publication Data

US 2008/0205391 A1 Aug. 28, 2008

(51) Int. Cl.
*H04J 1/16* (2006.01)
*H04L 12/56* (2006.01)

(52) U.S. Cl. .............. 370/254; 370/252; 370/282; 370/389

(58) Field of Classification Search .......... 370/252, 370/254, 389, 282
See application file for complete search history.

(56) References Cited

U.S. PATENT DOCUMENTS

| | | | |
|---|---|---|---|
| 5,708,654 A * | 1/1998 | Arndt et al. .......... | 370/242 |
| 5,724,510 A * | 3/1998 | Arndt et al. .......... | 709/220 |
| 7,200,649 B1 * | 4/2007 | Batke et al. .......... | 709/222 |
| 7,414,996 B2 * | 8/2008 | Fan ..................... | 370/338 |
| 2005/0060390 A1 * | 3/2005 | Vakil et al. .......... | 709/220 |
| 2005/0213560 A1 * | 9/2005 | Duvvury .............. | 370/351 |
| 2006/0047807 A1 * | 3/2006 | Magnaghi et al. ..... | 709/224 |
| 2008/0019499 A1 * | 1/2008 | Benfield et al. ...... | 379/221.15 |
| 2008/0095160 A1 * | 4/2008 | Yadav et al. .......... | 370/390 |

* cited by examiner

*Primary Examiner*—John Pezzlo
(74) *Attorney, Agent, or Firm*—Myers Bigel Sibley & Sajovec, P.A.

(57) ABSTRACT

Methods, devices and computer program products for self partitioning a data network are provided. A network device that is using an address of another network device is identified, the network is automatically partitioned to eliminate the potential conflict, and address conflict resolution is initiated. Partitioning the network may include closing a port over which the routing packet was received from the network device that advertised the conflict, or may include closing the logical connection to that network device. A routing database may be cleared of information previously received from the network device that advertised the conflict so that no routes exist through that device any more. Conflict resolution may include assigning a different address to the network device identified as having a conflicting address, and then allowing the identified network device to communicate with other network devices using the newly assigned address.

28 Claims, 2 Drawing Sheets

METHODS AND APPARATUS FOR SELF PARTITIONING A DATA NETWORK TO PREVENT ADDRESS CONFLICTS

FIELD OF THE INVENTION

The present invention relates generally to data networks and, more particularly, to routing protocols utilized by network devices.

BACKGROUND OF THE INVENTION

Packet-switched data networks include various devices, such as routers, interconnected through multiple types of network connections and topologies, that control the forwarding of data packets. A router may create or maintain a table of the available routes and their conditions, and use this information along with distance and cost algorithms to determine the best route for a given data packet. Typically, a data packet may travel through a number of network points with routers before arriving at its destination.

Routing protocols may be used in data networks to discover other routers and to provide for timely and efficient routing of data packets. Routing may involve maintaining a routing table that contains the information necessary to forward a data packet along the best path toward its destination. Each data packet may contain information about its origin and destination. When a data packet is received, a network device examines the data packet and matches it to the routing table entry providing the best match for its destination. The table then provides the device with instructions for sending the data packet to the next hop on its route across the network.

In order for a routing protocol to work, each network device must have a unique address. Traditional identifiers, such as media access controller (MAC) addresses, serial numbers, etc., may be used as network device addresses because they provide guaranteed uniqueness. However, these traditional identifiers may be long and, therefore, not very user friendly. Moreover, long traditional identifiers may create unnecessary overhead in a data packet. A shorter address could also be used but must be guaranteed to be unique.

In some applications, such as private interconnects between stackable switches, shorter addresses, sometimes automatically selected or assigned, are often used as aliases for addressing in data path forwarding in order to minimize packet overhead. Unfortunately, a routing protocol may not be able to use these shorter addresses directly because they may not be guaranteed to be unique.

Conventional solutions to this problem involve the use of a long, unique address for routing and discovery of devices, followed by the automatic assignment of a shorter address as an alias for the longer address. This approach is one of conflict avoidance—first network devices are discovered based on longer unique addresses, and then automated address assignment is performed to ensure uniqueness of addresses. Unfortunately, this approach may be problematic for several reasons. Manual assignment of addresses may be much preferred over automated assignment. For example, it is likely desirable to assign similar addresses to network devices that are in close proximity. In this way, automatic assignment may not assign a short address in a way that is friendly to a user of the network (i.e., the shorter address may not reflect the physical location of a device in the network or may not reflect user preferences). Additionally, changing the addresses of a network device (which may occur if assignment is automated) can be highly undesirable. For example, in an application of a private interconnect between stackable switches, the short address alias may be used outside of the routing protocol (for instance in configuration or management applications). Automatically re-assigning the address in such applications would have severe negative implications. Finally, if two networks are merged, more than one device may end up with the same short address, which can trigger (multiple) address reassignments, thereby forcing network devices into a temporary inoperable or unstable state until address conflicts are resolved. It may be preferable in some applications to keep the original networks intact, thus providing continuous connectivity on the original network(s), rather than merge them and create a temporarily unstable network. As such, automatic address assignment is undesirable in some applications.

Ensuring the uniqueness of a network device address for routing purposes has been a problem since the existence of routing protocols. Perlman et al. (U.S. Pat. No. 6,898,187) describes advertising devices that detect duplicate network device addresses. The advertising devices then infer whether it is a real duplicate by using a threshold of mismatch of sent and received sequence numbers. If the inference is positive, one of the advertisers selects a different address. This is a strategy of conflict detection and correction which suffers many of the shortcomings discussed earlier.

Chin et al. (K. W. Chin et. al., Routing in MANETs with Address Conflicts; The Second Annual International Conference on Mobile and Ubiquitous Systems: Networking and Services; 2005) describes a routing protocol where duplicate network device addresses are allowed in the context of mobile ad-hoc networks. The Chin et al. routing protocol utilizes an extra identifier appended onto a routing address to make the address unique. However, the resulting unique address is very long and therefore would create a lot of unnecessary overhead within a data packet, and a lot of complexity in the forwarding decision.

Other known address conflict protocols rely on servers. Therefore their applicability to use in routing protocols may be limited in that the servers cannot generally be reached without the connectivity provided by the routing protocol. Furthermore, these assignment protocols may not allow manual address assignments.

SUMMARY OF THE INVENTION

According to some embodiments of the present invention, a method of self partitioning a data network includes identifying a network device that is using an address of another network device, automatically partitioning the network to eliminate the potential conflict and then initiating address conflict resolution. Each network device maintains an identification table of other network devices connected to the network. The identification table includes a respective address and identifier pair for each network device. When a routing protocol packet is received from another network device, the address and identifier in the packet are compared with address/identifier information in the identification table to determine if there is an address conflict between the advertising device and another device (two different identifiers associated with the same device).

When an address conflict is first identified between two network devices (i.e. one network device receives a routing protocol packet with an (address, identifier) pair that conflicts with one already known locally), the network is automatically partitioned between those two network devices, and an alarm may be issued and/or displayed. Partitioning the network may include closing a port over which the routing packet was received from the network device that advertised the conflict, or may include just closing the logical connection to that network device. In particular, a routing database may be cleared of information previously received from the network device that advertised the conflict so that no routes exist through that device any more.

According to some embodiments of the present invention, conflict resolution may include assigning a different address (i.e., an address that is unique to the network) to the network device identified as having a conflicting address, and then allowing the identified network device to communicate with other network devices using the newly assigned address. That address assignment could be automated, but may involve manual intervention for some applications.

According to some embodiments of the present invention, a stackable switch connected to a switch interconnection network is configured to identify an address conflict switch interconnection, partition the switch interconnection to ensure address uniqueness across each partition, and initiate address conflict resolution. The stackable switch may also be configured to assign a different address to a conflicting network device, wherein the different address is unique to the switch interconnection, and allow the identified network device to communicate with other network devices using the different address. Assigning a different address to a conflicting network device may be performed manually by a user. In stackable switch applications, each switch has direct connections to an internal switch interconnection network over which only the switches communicate. The switch interconnection is used to provide data and management connectivity between the co-managed switch devices. The stack itself has connections onto a general data communications network by which all stacked switches can communicate to other network devices.

According to some embodiments of the present invention, a plug-and-play network device connected to a data network is configured to identifying an address conflict within the network, partition the network to ensure address uniqueness across each partition, and initiate address conflict resolution. The plug-and-play network device may also be configured to assign a different address to a conflicting network device, wherein the different address is unique to the network, and allow the identified network device to communicate with other network devices using the different address. Assigning a different address to a conflicting network device may be performed manually by a user.

Embodiments of the present invention are configured to detect duplicate addresses, to automatically partition a network such that duplicate addresses do not exist in any part, to prevent duplicate addresses from disrupting existing connectivity, and to merge two operational networks with duplicate addresses wherein the networks are logically preserved until duplicate addresses are resolved.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

Figure 1:
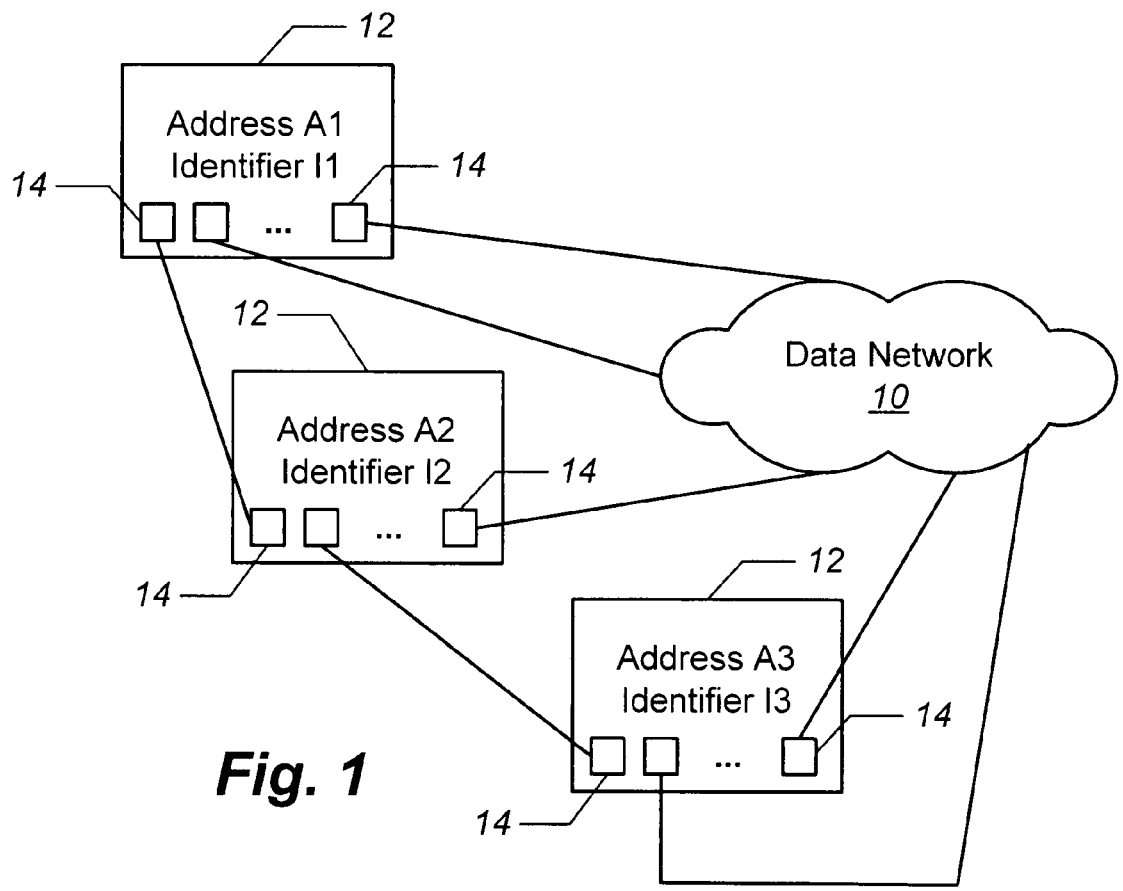
FIG. 1 illustrates a data network with a plurality of network devices connected thereto, wherein the network devices are configured to detect address conflicts and partition devices with conflicting addresses, according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware or hardware in combination with software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for identifying network device address conflicts and partitioning devices with conflicting addresses, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

FIG. 1 illustrates a data network 10 with a plurality of network devices 12 (e.g., routers, stackable switches, plug-and-play devices, etc.) connected thereto. Each network device 12 has an address and an identifier, and each network device 12 is configured to advertise data packets to other network devices via respective ports 14. The use of addresses and identifiers, and the advertisement of data packets according to network routing protocols is well known in the art and need not be explained further herein.

Figure 2:
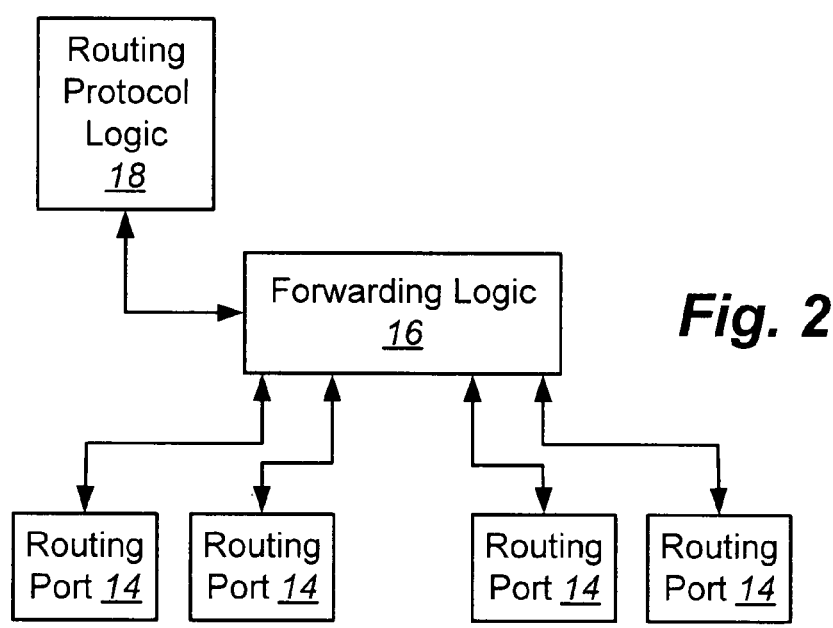
FIG. 2 is a block diagram illustrating logical components of a network device that is configured to detect address conflicts and partition devices with conflicting addresses, according to some embodiments of the present invention.

Referring to FIG. 2, a network device 12, according to an embodiment of the present invention, includes three logical components: routing ports 14, forwarding logic 16, and routing protocol logic 18. The routing ports 14 are interconnection ports that connect a device 12 to adjacent devices to form a network 10. The forwarding logic 16 examines the header of a data packet received on a routing port 14 and makes forwarding decisions either to local device processing or to the next device in the network 10. The routing protocol logic 18 receives and emits routing protocol packets; maintains the routing database; and constructs the forwarding table. The routing protocol logic interacts with the forwarding logic 16 to ensure that forwarding tables are set appropriately.

However, embodiments of the present invention are not limited to the three illustrated discrete logical components (i.e., 14-18). Two or more of these logical components (14-18) may be combined into a single component performing multiple functions, as would be understood by one skilled in the art of the present invention.

According to some embodiments of the present invention, the routing protocol logic 18 of each device is configured to periodically advertise the address and identifier pair of a respective device 12 over each routing port for the device 12 (i.e., send a routing protocol advertisement), as well as advertise the routes and destinations reachable through that network device. The association between a device address and an identifier is conventionally provisioned (i.e., assigned) manually, and is not conventionally generated automatically. Manual provisioning of a device address and identifier can be important for such applications as stackable switches where a short address is often provisioned by a user and used throughout the device for other functions (such as management). The provisioning of network device addresses and identifiers is well known to those skilled in the art of the present invention and need not be described further herein.

Embodiments of the present invention are not limited to any particular advertisement scheme and/or algorithms for calculating routes. As such, embodiments of the present invention can use, for example, distance vector and/or link state routing algorithms. The detailed operation of particular routing algorithms—link state, distance vector, or other—are well known to those skilled in the art and need not be described further herein.

Embodiments of the present invention do not preclude the inclusion of other information in a routing protocol advertisement and do not depend on the metric or granularity by which "distance" is measured. Embodiments of the present invention can use identifiers and addresses in any format. For example, the "distance" could be a hop count, and the "identifier" could be a MAC address or serial number.

The routing protocol logic 18 for each device 12 maintains a conventional identification table of address and identifier pairs for other network devices that have been learned. Identification tables are well understood by those skilled in the art of the present invention and need not be described further herein. Each entry in the identification table contains the address and identifier for a respective device 12. For example, when an advertisement packet is received from another device, the routing protocol logic 18 of the receiving device 12 extracts the address and identifier pair from the packet. The identifier for that address from the packet is compared with the identifier for that address in the local table. In order to avoid communication conflicts, there can only be one unique identifier per address. According to some embodiments of the present invention, each entry in the identification table may have an aging period assigned thereto so that it can be purged over time when no further advertisement packets are received.

If the address from a received packet is not in the identification table, the address/identifier pair is added to the identification table. If the unique identifier of the address matches the unique identifier associated with that address already at that routing logic instance (there can be only one unique identifier associated with each address), then the normal distance vector or link state routing process, for example, can continue and the forwarding table is updated. If the unique identifier does not match the known/expected unique identifier, then an address conflict has been detected. In this case, a conflict resolution strategy is implemented.

In one example of a conflict resolution strategy, according to some embodiments of the present invention, the port over which an advertisement packet was received is not allowed to be used in forwarding decisions, and any previous advertisement packets received via that port are erased. Any distance vector or link state routing data associated with that port will also be discarded. This resolution strategy is useful when a distributed networked system is operational, and an additional system(s) is added to the network but an address conflict is discovered. In this case, it is desirable to not interrupt the existing connectivity.

When a conflict is detected, normal data flow is not allowed to continue over the particular connection, effectively partitioning the network. An alarm may be raised to alert appropriate personnel that an address conflict has been detected and manual intervention is needed to resolve the conflict. Alternatively, a conflict resolution algorithm may be invoked to determine which address and unique identifier should be accepted and which rejected. Various conflict resolution algorithms may be utilized, without limitation.

Figure 3:
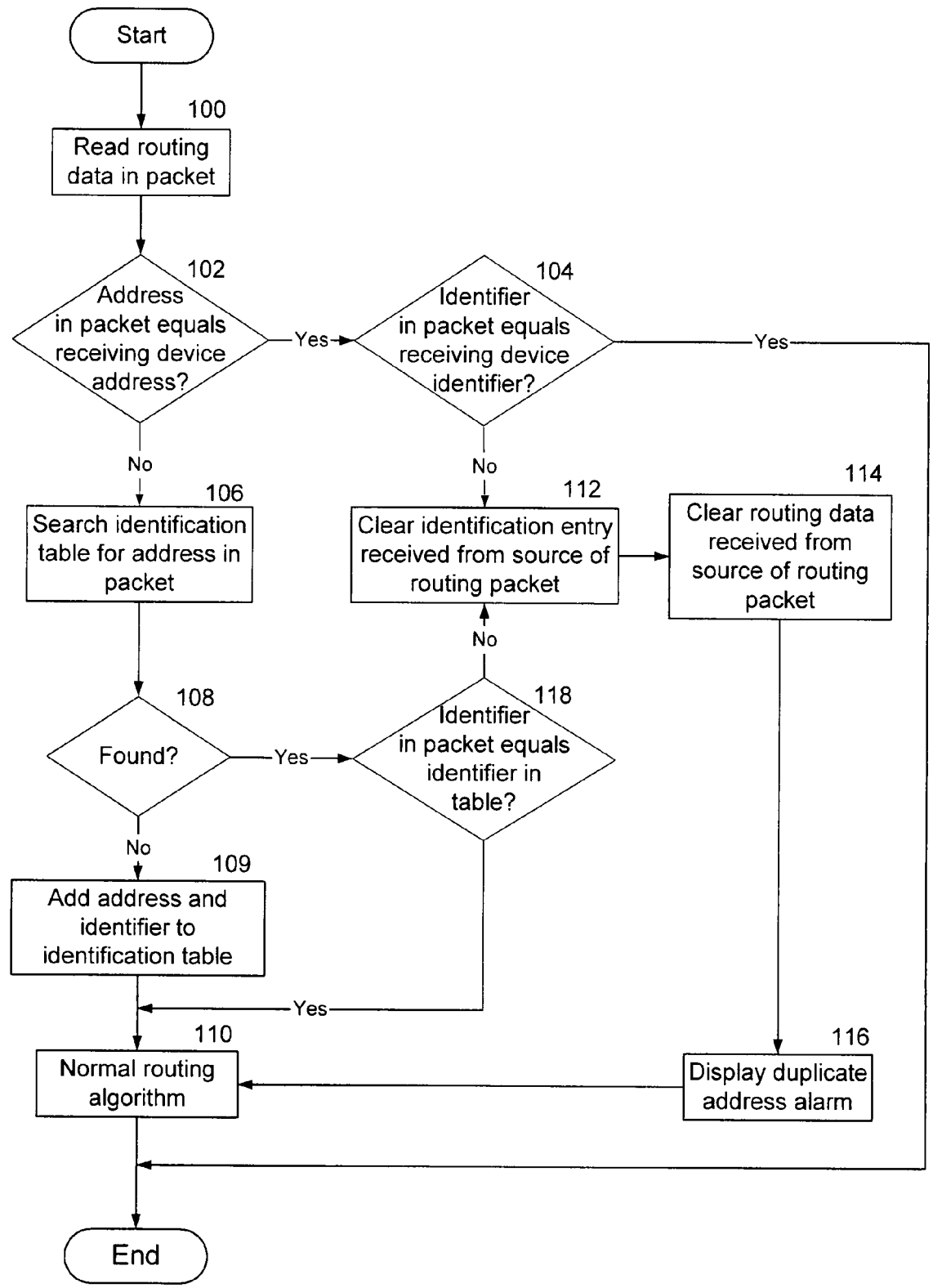
FIG. 3 is a flow chart that illustrates exemplary operations for detecting address conflicts and partitioning devices with conflicting addresses, according to some embodiments of the present invention.

Referring to FIG. 3, a method of self partitioning a data network to eliminate address conflicts, according to some embodiments of the present invention, will now be described. Operations represented by the various blocks of FIG. 3 are performed by the routing protocol logic 18 of a respective network device. The routing logic is used to control the forwarding logic 16. The route data in an advertising data packet received from another network device is read by the receiving device (Block 100). The route data for a particular route generally consists of an address, an identifier, and a cost/distance metric for that route through the device transmitting this advertisement. Other fields may also be applicable. The address in the received route is compared with the address of the receiving device (Block 102). If the address in the received route matches the address of the receiving device, a determination is made whether the identifier in the received packet matches the identifier of the receiving device (Block 104). If the identifier in the received route matches the identifier of the receiving device, the receiving device ignores the received advertising data packet because the particular route is one to the receiving device itself. If the identifier in the received route does not match the identifier of the receiving device, then a conflict exists because the advertisement contained a route with a duplicate address and conflicting identifier.

If the address in the received route does not match the address of the receiving device (Block 102), the receiving device's identification table is searched for the address in the received route (Block 106). If the identification table does not contain the address in the received route (Block 108), the identification data (address, identifier) from that received route should be added to the identification table as there is no current information about that address (Block 109). Once the identification table is updated, a traditional routing algorithm may be utilized to determine whether this route should update the routing table based on the received route (Block 110). If the identification table does contain the address in the received route (Block 108), a determination is made whether the identifier in the received route matches an identifier in the device's identification table (Block 118). If the identification table does contain the identifier in the received route (Block 108), a traditional routing algorithm may be utilized to determine whether this route should update the routing table based on the received route (Block 110). If the identification table does not contain the identifier in the received route (Block 118), then a conflict exists because the advertisement contained a duplicate address with conflicting identifier.

When a conflict is identified (Block 118 or Block 104), the network is partitioned until the address conflict can be resolved. Partitioning may include discontinuing communications over the receiving port or to the device from which the conflict sourced, clearing a routing database of any identification entry that was received from the peer device that sourced the conflict (Block 112) and/or clearing a routing database of any routing data that was received from the peer device that sourced the conflict (Block 114). In addition, a warning, such as a duplicate address alarm, may be displayed (Block 116). Partitioning the network to ensure address uniqueness across each partition comprises applying a partitioning algorithm to any type of routing protocol. Exemplary routing protocols include, but are not limited to, distance vector algorithms such as RIP (Routing Information Protocol), link state protocols such as OSPF (open shortest path first), ring-based algorithms such as RPR (resilient ring protocol), and variations thereof.

Conflict resolution may include assigning a different address (i.e., an address that is unique to the network) to the network device identified as having a conflicting address, and then allowing the identified network device to communicate with other network devices.

FIGS. 1-3 illustrate the architecture, functionality, and operations of some embodiments of methods, devices, and computer program products for reducing network device conflicts in a data network. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of self partitioning a data network, wherein a respective network device in the data network includes both an address and an identifier, the method comprising the following steps performed by a network device:

identifying an address conflict between two devices within the network;

automatically partitioning the network into parts in response to identifying the conflict such that duplicate device addresses causing the conflict do not exist together in a physical part of the network to ensure address uniqueness in each physical part; and initiating address conflict resolution.

2. The method of claim 1, wherein a respective network device maintains an identification table of other network devices connected to the network, wherein the identification table includes a respective address and identifier pair for respective network devices, and wherein identifying an address conflict within a network comprises receiving a route within a routing packet from another network device and comparing an address and identifier contained within the routing packet with address/identifier information in the identification table.

3. The method of claim 1, wherein partitioning the network comprises clearing a routing database of information previously received from a source of the conflict.

4. The method of claim 1, wherein partitioning the network comprises closing a port over which the data packet was received from the source of the conflict.

5. The method of claim 1, wherein initiating address conflict resolution comprises displaying an alarm.

6. The method of claim 1, further comprising:
assigning a different address to a conflicting network device, wherein the different address is unique to the network; and
allowing the identified network device to communicate with other network devices using the different address.

7. The method of claim 6, wherein assigning a different address to a conflicting network device is performed automatically.

8. The method of claim 6, wherein assigning a different address to a conflicting network device is performed manually.

9. The method of claim 1, wherein the data network is a private communication network between co-managed network devices.

10. The method of claim 1, wherein partitioning the network to ensure address uniqueness across each partition comprises applying a partitioning algorithm to routing protocols selected from the group consisting of distance vector algorithms, link state protocols, and ring-based algorithms.

11. The method of claim 1, wherein a network device in the data network is a stackable switch.

12. The method of claim 1, wherein a network device in the data network has a plug-and-play configuration.

13. A network device connected to a data network, comprising:
means for identifying an address conflict between two devices within the network;
means for automatically partitioning the network into parts in response to identifying the conflict such that duplicate device addresses causing the conflict do not exist together in a physical part of the network to ensure address uniqueness in each physical part; and
means for initiating address conflict resolution.

14. The network device of claim 13, further comprising an identification table of other network devices connected to the network, wherein the identification table includes a respective address and identifier pair for respective network devices, and wherein the means for identifying an address conflict within a network comprises means for receiving a route within a routing packet from another network device and means for comparing an address and identifier contained within the routing packet with address/identifier information in the identification table.

15. The network device of claim 13, wherein the means for partitioning the network comprises means for clearing a routing database of information previously received from a source of the conflict.

16. The network device of claim 13, wherein the means for partitioning the network comprises means for closing a port over which the data packet was received from the source of the conflict.

17. The network device of claim 13, wherein the means for initiating address conflict resolution comprises means for displaying an alarm.

18. The network device of claim 13, further comprising:
means for assigning a different address to a conflicting network device, wherein the different address is unique to the network; and
means for allowing the identified network device to communicate with other network devices using the different address.

19. The network device of claim 18, wherein the means for assigning a different address to a conflicting network device comprises means for automatically assigning a different address.

20. The network device of claim 18, wherein the means for assigning a different address to a conflicting network device comprises means for manually assigning a different address by a user.

21. The network device of claim 13, wherein the means for partitioning the network comprises means for applying a partitioning algorithm to routing protocols selected from the group consisting of distance vector algorithms, link state protocols, ring-based algorithms, and variations thereof.

22. A stackable switch connected to a switch interconnection network, comprising:
means for identifying an address conflict switch interconnection between two devices within the network;
means for automatically partitioning the switch interconnection into parts in response to identifying the conflict such that duplicate device addresses causing the conflict do not exist together in a physical part of the network to ensure address uniqueness in each physical part; and
means for initiating address conflict resolution.

23. The stackable switch of claim 22, further comprising:
means for assigning a different address to a conflicting network device, wherein the different address is unique to the switch interconnection; and
means for allowing the identified network device to communicate with other network devices using the different address.

24. The stackable switch of claim 23, wherein the means for assigning a different address to a conflicting network device comprises means for manually assigning a different address by a user.

25. A plug-and-play network device connected to a data network, comprising:
means for identifying an address conflict with another device within the network;
means for automatically partitioning the network into parts in response to identifying the conflict such that duplicate device addresses causing the conflict do not exist together in a physical part of the network to ensure address uniqueness in each physical part; and
means for initiating address conflict resolution.

26. The plug-and-play network device of claim 25, further comprising:
means for assigning a different address to a conflicting network device, wherein the different address is unique to the network; and means for allowing the identified network device to communicate with other network devices using the different address.

27. The plug-and-play network device of claim 26, wherein the means for assigning a different address to a conflicting network device comprises means for manually assigning a different address by a user.

28. A computer program product for self partitioning a data network, wherein a respective network device in the data network includes both an address and an identifier, comprising:
- a computer readable storage medium having computer readable program code embodied therein, the computer readable program code being configured to:
  - identify an address conflict between two devices within the network;
  - automatically partition the network into parts in response to identifying the conflict such that duplicate device addresses causing the conflict do not exist together in a physical part of the network to ensure address uniqueness in each physical part; and
  - initiate address conflict resolution.

* * * * *